United States Patent
Klein Gunnewiek et al.

(10) Patent No.: US 9,948,943 B2
(45) Date of Patent: Apr. 17, 2018

(54) IMAGE PROCESSING SYSTEM FOR PROCESSING COMBINED IMAGE DATA AND DEPTH DATA

(75) Inventors: Reinier Bernardus Maria Klein Gunnewiek, Eindhoven (NL); Christiaan Varekamp, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 822 days.

(21) Appl. No.: 12/517,224

(22) PCT Filed: Dec. 3, 2007

(86) PCT No.: PCT/IB2007/054899
§ 371 (c)(1),
(2), (4) Date: Jun. 2, 2009

(87) PCT Pub. No.: WO2008/068707
PCT Pub. Date: Jun. 12, 2008

(65) Prior Publication Data
US 2010/0060717 A1  Mar. 11, 2010

(30) Foreign Application Priority Data
Dec. 4, 2006  (EP) .................................. 06125340

(51) Int. Cl.
*H04N 13/00* (2006.01)
*H04N 7/12* (2006.01)
(Continued)

(52) U.S. Cl.
CPC ......... *H04N 19/46* (2014.11); *H04N 13/0011* (2013.01); *H04N 19/597* (2014.11); *H04N 13/0285* (2013.01)

(58) Field of Classification Search
CPC .. H04N 13/0011; H04N 19/46; H04N 19/597; H04N 13/0285
(Continued)

(56) References Cited

U.S. PATENT DOCUMENTS 6,832,007 B1 * 12/2004 Zhang et al. ................. 382/257
2003/0012277 A1   1/2003 Azuma
(Continued)

FOREIGN PATENT DOCUMENTS

WO  2004051573 A2  6/2004
WO  2004097737 A1  11/2004
(Continued)

OTHER PUBLICATIONS

Dell'Acqua et al: "Reconstuction of Planar Surfaces Behind Occlusions in Range Images"; IEEE Transactions on Pattern Analysis and Machine Intelligence, vol. 24, No. 4, Apr. 2002.
(Continued)

*Primary Examiner* — Gims Philippe
*Assistant Examiner* — On S Mung

(57) ABSTRACT

A combination of image data and depth data is supplied defining luminance and/or color for image positions in an image and distance to objects visible at said image positions respectively. The image data and the depth data are compressed by a compressor (120) and decompressed by a decompressor (16). The depth data is dilated before said compressing, to move an edge between a region of image positions with a relatively smaller distance and a region of image positions with a relatively greater distance towards the region of image positions with a relatively greater distance.

20 Claims, 3 Drawing Sheets

(51) Int. Cl.
*H04N 19/46* (2014.01)
*H04N 19/597* (2014.01)
*H04N 13/02* (2006.01)

(58) Field of Classification Search
USPC .................. 348/43; 345/629; 382/154, 239
See application file for complete search history.

(56) References Cited

U.S. PATENT DOCUMENTS

| | | | |
|---|---|---|---|
| 2004/0151374 A1* | 8/2004 | Lipton et al. | 382/181 |
| 2005/0219264 A1 | 10/2005 | Shum et al. | |
| 2005/0285875 A1 | 12/2005 | Kang et al. | |
| 2006/0114253 A1 | 6/2006 | Zitnick et al. | |
| 2009/0284366 A1 | 11/2009 | Haartsen | |

FOREIGN PATENT DOCUMENTS

| | | |
|---|---|---|
| WO | 2005034035 A1 | 4/2005 |
| WO | 2006111930 A2 | 10/2006 |
| WO | 2007125477 A2 | 11/2007 |
| WO | 2009010926 A2 | 1/2009 |
| WO | 2009040718 A2 | 4/2009 |
| WO | 2009093161 A1 | 7/2009 |
| WO | 2009136309 A2 | 11/2009 |
| WO | 2009136312 A1 | 11/2009 |

OTHER PUBLICATIONS

Zhou et al: "Fast Tracking of Semantic Video Object Based on Motion Prediction and Subregion Extraction"; International Conference on Image Processing, 2002, Publication Date Jun. 24-28, 2002, vol. 3, pp. 621-624.

Gvili et al: "Depth Keying"; Stereoscopic Displays and Virtual Reality Systems X, (Woods, Bolas, Merritt, Benton, Eds),Proceedings of SPIE-IS&T Electronic Imaging, SPIE vol. 5006, (2003), pp. 564-574.

Zitnick et al: "High-Quality Video View Interpolation Using a Layered Representation"; ACM Transactions on Graphics (TOG), Proceedings of ACM Siggraph 2004, vol. 23, Issue 3 (Aug. 2004), pp. 600-608.

Meesters et al: "A Survey of Perceptual Evaluations and Requirements of Three-Dimensional TV"; IEEE Transactions on Circuits and Systems for Video Technology, vol. 14, No. 3, Mar. 2004, pp. 381-391.

Morvan et al: "Novel Coding Technique for Depth Images Using Quadtree Decomposition and Plane Approximation"; Visual Communications and Image Processing 2005, (Li, Pereira, Shum, Tescher, Eds), Proceedings of SPIE vol. 5960, (2005), pp. 596031-596031-8.

Duan et al: "Compression of the Layered Depth Image"; IEEE Transactions on Image Processing, vol. 12, No. 3, Mar. 2003, pp. 365-372.

Uehira et al: "Compression of Depth-Fused 3-D Images Using Depth Map Data"; Journal of Electronic Imaging, vol. 14(2), Apr.-Jun. 2005, pp. 023020-1-023020-7.

Varekamp, C.: "Compression Artifacts in 3D Television Signals"; Proceedings of SPS-Darts 2006 (The 2ND Annual IEEE Benelux/DSP Valley Signal Processing Symposium), pp. 7-10.

* cited by examiner

IMAGE PROCESSING SYSTEM FOR PROCESSING COMBINED IMAGE DATA AND DEPTH DATA

FIELD OF THE INVENTION

The invention relates to a method and system for processing image data, comprising encoding and decoding, as well as to a method and device for encoding.

One method of encoding video information for three dimensional viewing comprises adding a depth data image to conventionally encoded video data, so that the video data defines intensity and/or color as a function of image position in an image and the depth data image defines distance to objects visible at the image positions.

A problem that occurs when such techniques are used is described in a publication by C. Varekamp, titled "Compression artefacts in 3D television signals", and published in The proceedings of the second annual IEEE BENELUX/DSP Valley Signal Processing Symposium (SPS-DARTS 2006). Mar. 28-29, 2006. Metropolis, Antwerp, Belgium.

This article describes a problem that arises when the depth data is encoded using quantized DCT coefficients, as used for compressing video information according to the MPEG standard. The article notes that after decoding quantized DCT coefficients artificial irregular local displacements of object depth boundaries (depth steps) may be defined by the decompressed depth data. As a result the object depth boundaries no longer coincide with intensity edges in the image. When the depth data is used to change the viewpoint to scene depicted by the image, this leads to visible jagged edges of objects. The article does not describe solutions to this problem, except for suggesting encoding a lower-resolution (down-scaled) depth map and interpolating such a depth map (or more generally depth data) after decoding. Secondly it is suggested to perform edge-preserving post-filtering to reduce artefacts.

SUMMARY OF THE INVENTION

Among others it is an object to provide for a method and system for encoding and decoding image data including depth information that suffers less from compression errors.

According to one aspect a method according to claim 1 is provided. Herein dilation of the depth data is performed before compression, so that image positions where the depth data indicates depth edges between regions at different distances are moved into the regions with greatest distance. Thus the depth edges come to lie at image positions where the image data on both sides of the depth edges corresponds to objects at the greatest distance. It has been found that this prevents artefacts with a minimum of image correction. In an embodiment this is applied to the computation of an image from a synthetic viewpoint from the decompressed image data and decompressed dilated depth data. The dilation prevents that artefacts occur in this case when intensity data for different positions is moved relative to each other.

In another embodiment an amount of dilation is set adaptively to the image. The positions are detected where the combination of compression and decompression causes errors in the distance. The amount of dilation is adapted dependent on a measure of coincidence of the detected positions and gradients in the image as a function of position. Thus, the amount of dilation can be set to minimize artefacts. This may also be used to control dilation after decompression.

BRIEF DESCRIPTION OF THE DRAWINGS

These and other objects and advantageous aspects will become apparent from a description of exemplary embodiments using the following figures.

DESCRIPTION OF THE EMBODIMENTS

Figure 1:
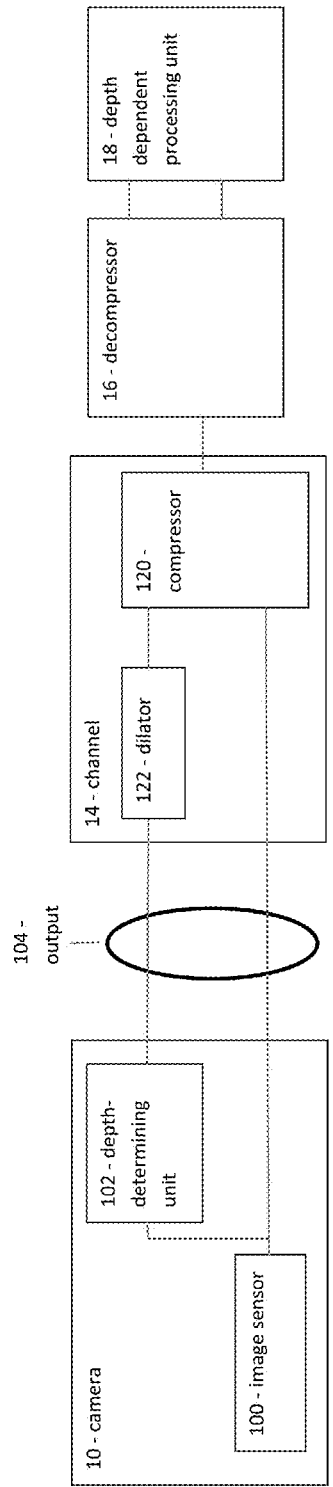
FIG. 1 shows an image processing system.

FIG. 1 shows an image processing system comprising a camera 10, a compression apparatus 12, a channel 14, a decompression apparatus 16, and a depth dependent processing unit 18.

Camera 10 is provides with an image sensor 100 and a depth-determining unit 102. Camera 10 has an output 104 for supplying image data and depth data to compression apparatus 12. The image data defines image intensity and preferably color as a function of position in the image. The depth data defines distance from the camera to objects to which the image data is attributed as a function of the position in the image.

The specific method of determining depth is not critical for the present invention. Various methods can be used, such as the use of stereoscopic image sensors followed by the determination of correspondence between image locations in different stereoscopic images, analysis of the change of image positions where an object is imaged when the camera is moved, depth-from-image techniques such as depth from focus, use of a depth sensor in addition to image sensor 100, manual or semi-manual depth map creation etc. Many such techniques are known per se. By way of example, a connection is shown between image sensor 100 and depth determining unit 102, to illustrative the use of the image captured by image sensor 100 for determining depth. However, such a connection may not be needed if a separate depth sensing method is used. Preferably image data and depth data are provided in the form of data describing a stream of images as a function of time and a corresponding stream of depth data. For the sake of illustration, separate connections are shown for image data and depth data, but it should be understood that this data can be multiplexed over a shared connection.

Compression apparatus 12 comprises compressor 120 and a dilator 122. Dilator 122 is configured to receive the depth data from camera 10 and to apply image dilation to the depth data. Compressor 120 receives both the image data from camera 10 and the dilated depth data. Compressor 120 is configured to compute compressed data from the image data and the dilated depth data and to pass the compressed data to channel 14. Compressor 120 uses a frequency transform to perform compression. The known JPEG or MPEG compression techniques may be used for example. In JPEG DCT compression technique computes the DCT (Discrete Cosine Transform) coefficients of image values for blocks of locations in an image. The DCT coefficients are quantized to compress the image. A similar technique is used in MPEG applied both to certain images directly and to residuals that remain after image representation by motion vectors. In the present exemplary system DCT transforms are applied both to the intensity image and/or color plane images defined by the image data and to a depth image defined by the dilated depth data. Separate compressors in compressor 12 may be used for this purpose, or a multiplexing technique may used to share a single core-compressor for both image data and depth data. As used herein the terms depth data and image data may indicate completely distinct sets of data, but the terms also cover the case wherein the depth data and the image data are not entirely separate. In an embodiment shared motion vectors are used to represent both image data and depth data for a frame relative to intra-coded image data and depth data for a different frame.

In an embodiment, stronger compression (with more loss of information) is used for the depth data than for the intensity image. For example, more higher frequency DCT coefficients are discarded for the depth image than for the intensity image (e.g. only DC coefficients), or a coarser quantization is used for the DCT coefficients of the depth image. Thus, the overhead for encoding depth data is minimized. Alternatively, or in addition, a reduced spatial and/or temporal resolution may be used for the depth data compared to the image data, the depth data being sub-sampled for example.

Decompression apparatus 16 is coupled to channel 14 to receive the compressed information. Channel 14 may represent a broadcast transmission channel or a combination of a recorder-reproduction apparatus for example. When JPEG or MPEG techniques are used for compression decompression apparatus 16 typically uses JPEG or MPEG techniques for decompression. Decompression apparatus 16 reconstructs approximate image data and depth data from the compressed data, representing an intensity and/or color image and a depth image which is similar to the intensity and/or color image and dilated depth image originally used by compression apparatus 12. Due to compression deviations may occur.

Depth dependent processing unit 18 receives the reconstructed image data and depth data and uses this data to construct an image. Various forms of processing may be used. In an embodiment depth dependent processing unit 18 is configured to compute a pair of stereoscopic images. In another embodiment depth dependent processing unit 18 is configured to computes a series of images from successive viewpoints, for display on a quasi three-dimensional display. In an embodiment depth dependent processing unit 18 has an input for receiving a user selection of a viewpoint (or view point changes). In each embodiment depth dependent processing unit 18 uses the image data and the depth data to compute a viewpoint dependent image. Techniques for this are known per se. The result of these techniques is that image data for an image position will be moved from that position to another over a movement distance and direction that depends on the change of viewpoint and the depth associated with the image position.

This movement can lead to several artefacts. First of all, changed boundaries may arise where a foreground image region is moved partly over a background region. Secondly gaps may arise where a background image region is de-occluded by the movement. In the gaps substitute image data has to be inserted. For this purpose a set of image regions neighboring the gap is preferably considered. From this set a region is selected that has the greatest distance. The image content in the gap is extrapolated from the selected region. The extrapolation may be performed using image data from the image itself, or extrapolated data may be inserted that has been obtained for the selected image region from other images in a video stream where the region is less occluded.

Dilator 122 is configured to apply image dilation to the depth data. Image dilation is known per se. As applied in dilator 122, dilator 122 is configured to change the depth image (represented by the depth data) everywhere where the depth image contains an edge between a region with relatively greater depth and a region with relatively smaller depth, the edge being moved into the region with relatively greater depth. Thus foreground objects are made to appear larger in the depth image. Any known technique may be used for dilation. In one embodiment, for each position in the image the dilated depth is the minimum depth in a neighborhood region of the position, the same shaped and sized neighborhood region being used for each position, shifted to those positions. In an embodiment a horizontal, line shaped neighborhood region may be used, of one pixel high and a plurality of pixels (equal to the amount of dilation) long. In this case, dilation can be applied on a line by line basis, which reduces the amount of processing needed. In another embodiment a square or circle shaped neighborhood region may be used for this purpose for example, the diameter of the neighborhood region being determined by the degree of dilation.

In another embodiment a segmentation of the image into segments associated with objects may be used, a position being joined a segment that overlaps with the neighborhood region of the position and is associated with an object with least depth. In this case, the dilated depth may be derived from that object e.g. by extrapolation or copying the distance from a nearest image position in the object. In another embodiment a minimum of depths extrapolated from regions on different sides of the position may be used to obtain a dilated depth.

A corresponding dilation is not applied to the image data that represents the intensity image and/or color image. Thus, in the combination of image data and dilated depth data, the dilation has the effect that image data that belongs to more distant objects is assigned the distance of a closer object near the edges between the closer objects and the more distant objects.

The depth data is used to control movement of image data in order to compute an image from a selected viewpoint. When this is done, the dilation of depth data has the effect that image data for positions slightly beyond the edge of a foreground object in the image will be moved coherently with image data from the foreground object inside the edge. As a result the gaps due to movement will be surrounded by image data from the background (more distant objects), as will the changed boundaries. The effect of this is that artefacts due to the change of viewpoint will be less visible.

Compression induced errors in the depth data will lead to position errors of edges in the depth data. When the compression of the depth data is performed at a higher (more lossy) compression rate than for the image data, the depth errors can be large and spatially more distributed compared to image errors. Due to dilation, the image data surrounding the positions of these errors will all come from image data for the background in errors. It is thus prevented that these errors cause image data values for any positions on the foreground object to be moved differently from image data values for other positions on the foreground object.

By performing dilation before compression, it is avoided that errors due to compression/decompression are dilated. Among others this prevents that ringing artefacts in the depth data are dilated. Post decompression dilation applied to ringing artefacts that artificially produce depths that are even closer than the foreground object would grow due to dilation, leading to errors in both the foreground and background. By performing dilation before compression, it is prevented that dilation increases the effect of ringing. The effect of ringing is limited to image data for the background. It has been found that by performing dilation before compression, less dilation is needed to prevent different movement of foreground image data than if dilation were performed after decompression. Thus, contrary to normal wisdom, which regards dilation as a post-processing filtering step to remove artefacts, it is preferred to perform dilation as pre-processing before the artefacts arise.

Figure 2:
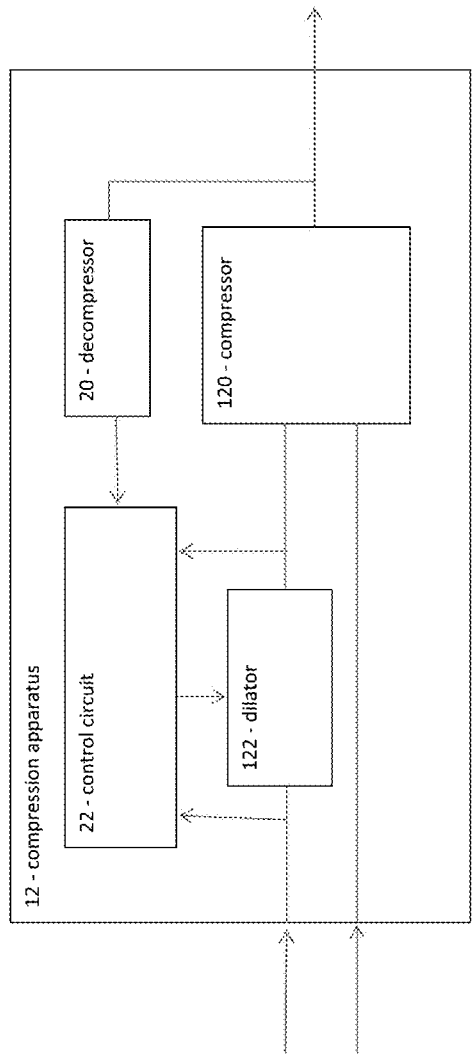
FIG. 2 shows a compression apparatus.

FIG. 2 shows an alternative compression apparatus 12 wherein the amount of dilation is controlled in a feedback loop. In addition to the components shown in FIG. 1 this compression apparatus comprises a decompressor 20 and a control circuit 22. Decompressor 20 has an input coupled to an output of compressor 120. Control circuit 22 has inputs coupled to the depth data input and to outputs of dilator 122 and decompressor 20. Control circuit 22 has an output coupled to a control input of dilator 122.

Figure 3:
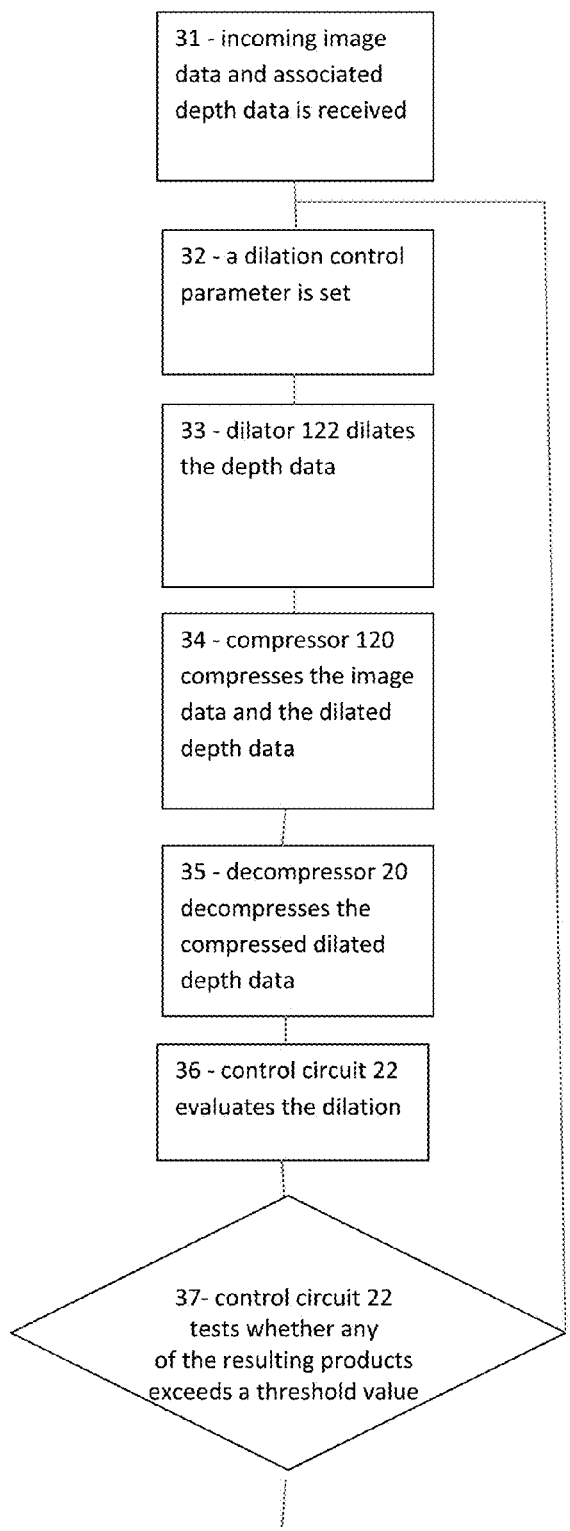
FIG. 3 shows a flow chart of compression.

FIG. 3 shows a flow chart of an embodiment of compression wherein the amount of dilation is controlled in a feedback loop. In a first step 31 incoming image data and associated depth data is received. The image data defines intensity and/or color for positions in an image and the depth data defines distances to objects visible at those positions. In a second step 32 a dilation control parameter is set. In a third step 33, dilator 122 dilates the depth data, i.e. it modifies the defined depths are modified so that edges between regions of image positions at different depth are moved into the regions with greater depth over a distance controlled by the dilation control parameter. In a fourth step 34 compressor 120 compresses the image data and the dilated depth data. In a fifth step 35 decompressor 20 decompresses the compressed dilated depth data. In a sixth step 36 control circuit 22 evaluates the dilation. Control circuit 22 computes differences between the decompressed dilated depth and the dilated depth before compression at a plurality of image positions. The differences are multiplied by gradient size values defined by the original depth data at corresponding image positions.

In a seventh step 37 control circuit 22 tests whether any of the resulting products exceeds a threshold value. If so control circuit updates the dilation control parameter to increase the distance over which edges defined by the depth data will be moved and the flow chart repeats from third step 23. If all resulting products are below the threshold the process finishes. As will be appreciated, compared to FIG. 1 the system of FIG. 2 adds sixth and seventh steps 36, 37.

In the case of a video sequence a next pair of image data—depth data is processed subsequently in the same way. In this case images in the video sequence are processed individually. In another embodiment the amount of dilation may be set for a sequence of successive images in a video sequence, for example to prevent artefacts (or more than a minimum number of artefacts in any image in the sequence. In another example the video time dependence of the amount of dilation is set so that variations above a predetermined temporal frequency are filtered out and artefacts (or more than a minimum number of artefacts in any image) are prevented. A low pass filtered frequency envelope of maximum selected amounts of dilation may be used for example. Setting the amount of dilation for a sequence has the advantage that temporal artefacts are avoided.

Although an example has been given wherein the amount of dilation is increased if any product exceeds the threshold, it should be appreciated that alternatively the increase may be dependent on an aggregate of the products exceeding the threshold, so that no increase in dilation is performed if large products occur only locally at isolated positions. The products and the aggregate are examples of measures of coincidence of the detected positions with edges. It should also be appreciated that other measures of coincidence may be used to evaluate the dilation.

In an alternative embodiment control circuit 22 evaluates dilation using a view from a synthetic viewpoint obtained from the image data and depth data after compression and decompression. If it is detectable that this view contains more than a predetermined amount of artefacts the dilation is taken to be insufficient. In this way needless dilation can be avoided when the difference between foreground and background image data is so small that no artefacts occur even if the depth data contains errors. Synthetic viewpoint generators for generating views from arbitrary viewpoints using depth data and image data are known per se. A synthetic viewpoint generator such as a computer programmed with a program for this purpose or special hardware may be used. The detection of artefacts may be performed for example by comparison of the view generated after compression and decompression with a view generated for the viewpoint from the depth data and image data without compression and decompression. As an alternative the view generated after compression and decompression may be processed to detect the presence of spatially irregular edges with spatial irregularities of a size corresponding to the effect of compression artefacts and comparison of the strength of such edges with a predetermined threshold.

As another example, the gradients in image data content near the position of differences between the depth data and decompressed dilated depth data may be weighed in the result. Furthermore, it should be appreciated that the criterion for deciding to increase dilation and return to third step 33 may be made increasingly restrictive as the amount of dilation is increased or that increases beyond a maximum may even be avoided altogether. Also a signal to noise ratio (PSNR) of the rendered view may serve as criterion.

As will be appreciated, the flow chart assumes that the dilation control parameter is initially set to a minimum value and subsequently increased until no artefact, or no more than a minimum of artefacts, arises due to compression and decompression. Alternatively, the process may start from a maximum dilation, the dilation being reduced until such an artefact, or more than a minimum of such artefacts arises. In another alternative, the process may start from any dilation and be continued in a direction dependent on the computed artefacts.

Thus, by controlling dilation before compression a disturbing amount of artefacts may be prevented. In a further compression apparatus 12 transmits the eventually selected amount of dilation for the image to decompression apparatus 16. An indication of the selected amount may be included in the video stream signal that contains the image data and the depth data. An image processing apparatus that may be part of depth dependent processing unit 18 of decompression apparatus may be provided and the transmitted amount of dilation may be supplied to this image processing apparatus to enable the image processing apparatus to reduce artefacts due to the dilation.

In an example of an embodiment the image processing apparatus is configured to erode the depth image by an amount corresponding to the selected amount received from the compression apparatus (e.g. by a fraction of less than 100%) of the dilation distance, after filtering out artefacts due to compression (this filtering may e.g. include median filtering). Thus artefacts due to dilation can be minimized. In this or another embodiment the image processing apparatus may be configured to control other forms of depth dependent image processing (such as foreground/background color mixing at the edges between foreground and background objects) according to the depth data obtained after decompression and erosion.

Figure 4:
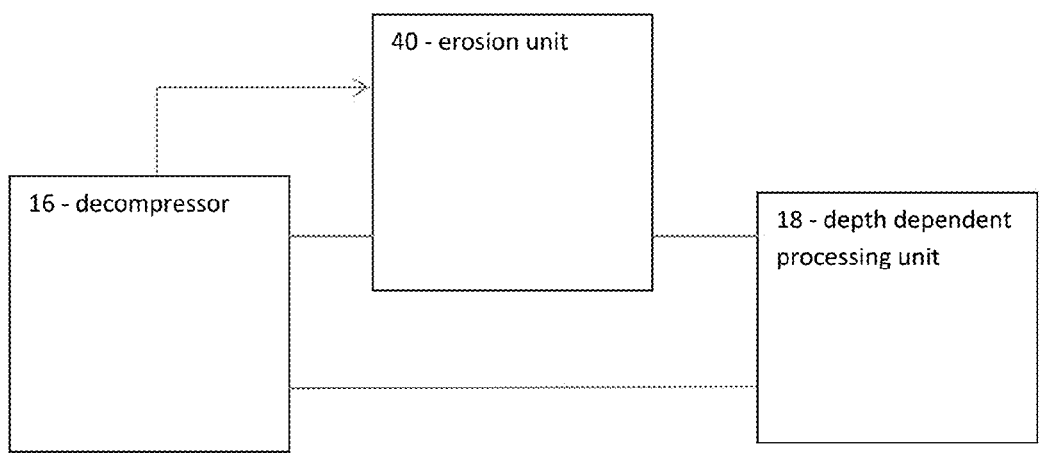
FIG. 4 shows decompression apparatus.

In another embodiment the amount of dilation before compression is set in excess of the minimum amount dilation than strictly necessary for avoiding that the depth boundary of an object in the image crosses the intensity/color boundary of that object. FIG. 4 shows a decompression apparatus for this embodiment. In this embodiment an erosion unit 40 is added for applying erosion after decompression to erode the decompressed depth image. The amount of erosion is no preferably more than the excess amount of dilation (erosion, as used here grows regions with greater distance from the boundary of regions with at less distance; in one embodiment erosion is implemented by replacing depth for each pixel position by the largest depth in a neighborhood region around that position). This serves to filter the decompressed depth image, removing small foreground regions or narrow extensions of such regions that are due to artefacts. The amount of erosion may controlled by the signaled amount of dilation. Instead of an unit 40 that applies erosion, a processor 40 may be used that is configured to perform other processing operations dependent on the signaled amount of dilation.

Compression apparatus 12 and decompression apparatus may be implemented using electronic circuits specifically designed to perform the described functions. Alternatively, programmable processors may be used, programmed with a computer program to perform these functions, or a mixture of specifically designed hardware and programmed processors may be used.

As described the application of dilation before compression has the effect that artefacts in views generated from synthetic viewpoints will be reduced. The invention is set forth in the claims. As used herein the term "comprising" does not exclude other elements or steps, that "a" or "an" does not exclude a plurality, and that a single processor or other unit may fulfill the functions of several means recited in the claims. Reference signs in the claims shall not be construed as limiting the scope.

The invention claimed is:

1. An image processing system comprising:
   an input circuit that receives image data and corresponding depth data,
      wherein the image data defines luminance and/or color for image locations, and
      wherein the depth data defines distances to objects at the image locations;
   a dilator circuit that receives the depth data from the input circuit,
      wherein the dilator circuit identifies a depth edge between a first region of a first depth and a second region of a second depth, wherein the second depth is significantly larger than the first depth, and
      wherein the dilator circuit creates dilated depth data by shifting the depth edge into the second region so that the image data on both sides of the depth edge corresponds to image data at the second depth; and
   a compressor circuit that receives the image data from the input circuit and the dilated depth data from the dilator circuit and creates therefrom compressed image data and compressed dilated depth data.

2. The system of claim 1, further comprising a control circuit, wherein the control circuit provides a dilation control parameter, and wherein the dilator circuit expands the depth edge into the second region based on the dilation control parameter.

3. The system of claim 2, further comprising a decompressor circuit, wherein the decompressor circuit decompresses the compressed dilated depth data to produce decompressed dilated depth data, and wherein the control circuit modifies the dilation control parameter based on differences between the dilated depth data and the decompressed dilated depth data, and the dilator circuit recreates the dilated depth data based on the modified dilation control parameter.

4. The system of claim 2, wherein the control circuit generates a view from a synthetic viewpoint based on the image data and the compressed dilated depth data, wherein the control circuit detects artifacts in the view, and wherein the control circuit modifies the dilation control parameter based on the detected artifacts.

5. The system of claim 2, wherein the control circuit iteratively modifies the dilation control parameter based on feedback from the compressor circuit until the compressed dilated depth data satisfies a criterion.

6. The system of claim 1, further comprising a decompressor circuit and a depth-dependent processing circuit, wherein the decompressor circuit decompresses the compressed image data and the compressed dilated depth data to produce decompressed image data and decompressed dilated depth data, and wherein the depth-dependent processing circuit generates a view from a synthetic viewpoint by spatially shifting the decompressed image data based on the decompressed dilated depth data.

7. The system of claim 6, further comprising an erosion circuit that erodes the decompressed dilated depth data and the depth-dependent processing circuit generates the view based on the eroded decompressed dilated depth data.

8. The system of claim 7, wherein the erosion circuit erodes the decompressed dilated depth data based on an amount of dilation applied by the dilation circuit.

9. The system of claim 6, wherein the depth-dependent processing circuit processes the decompressed image data and the decompressed dilated depth data to generate the view from the synthetic viewpoint based on an amount of dilation applied by the dilation circuit.

10. A method comprising:
    receiving image data and corresponding depth data,
       wherein the image data defines luminance and/or color for image locations, and
       wherein the depth data defines distances to objects at the image locations;
    identifying a depth edge between a first region of a first depth and a second region of a second depth, wherein the second depth is significantly larger than the first depth, and
    creating dilated depth data by shifting the depth edge into the second region so that the image data on both sides of the depth edge corresponds to image data at the second depth; and
    compressing the image data and the dilated depth data to create compressed image data and compressed dilated depth data for communication to a rendering device.

11. The method of claim 10, further comprising identifying an amount of dilation to be applied, and expanding the depth edge into the second region based on the amount of dilation to be applied.

12. The method of claim 11, further comprising decompressing the compressed dilated depth data to produce decompressed dilated depth data, and modifying the amount of dilation to be applied based on differences between the dilated depth data and the decompressed dilated depth data.

13. The method of claim 11, further comprising generating a view from a synthetic viewpoint based on the image data and the compressed dilated depth data, detecting artifacts in the view, and modifying the amount of dilation to be applied based on the detected artifacts.

14. The method of claim 11, further comprising iteratively modifying the amount of dilation to be applied based on feedback related to the compressed dilated depth data until the compressed dilated depth data satisfies a given criterion.

15. The method of claim 10, further comprising decompressing the compressed image data and the compressed dilated depth data to produce decompressed image data and decompressed dilated depth data, and generating a view from a synthetic viewpoint by spatially shifting the decompressed image data based on the decompressed dilated depth data.

16. The method of claim 15, further comprising eroding the decompressed dilated depth data before generating the view.

17. The method of claim 16, wherein the decompressed dilated depth data is eroded based on the amount of dilation applied by the dilation circuit.

18. The method of claim 6, wherein generating the view from the synthetic viewpoint is also based on an amount of dilation applied by the dilation circuit.

19. A non-transitory computer-readable medium that includes a program that, when executed by a processing circuit, causes the processing circuit to:
    receive image data and corresponding depth data,
        wherein the image data defines luminance and/or color for image locations, and
        wherein the depth data defines distances to objects at the image locations;
    identify a depth edge between a first region of a first depth and a second region of a second depth, wherein the second depth is significantly larger than the first depth, and
    create dilated depth data by shifting the depth edge into the second region so that the image data on both sides of the depth edge corresponds to image data at the second depth; and
    compress the image data and the dilated depth data to create compressed image data and compressed dilated depth data for communication to a rendering device.

20. The medium of claim 19, wherein the program causes the processor to iteratively modify an amount of dilation to be applied based on feedback related to the compressed dilated depth data until the compressed dilated depth data satisfies a given criterion.

\* \* \* \* \*